Patented Aug. 17, 1937

2,090,242

UNITED STATES PATENT OFFICE 2,090,242

METHOD OF VULCANIZING RUBBER

Jan Teppema, Wayne, N. J., assignor to Wingfoot Corporation, Wilmington, Del., a corporation of Delaware No Drawing. Application March 21, 1932, Serial No. 600,385

2 Claims. (Cl. 18—53)

My invention relates to accelerators of the vulcanization of rubber. More particularly, it relates to a novel class of mercaptothiazole derivatives which not only are highly satisfactory as accelerators of vulcanization, but also are readily prepared. In addition, such compounds are capable when used in rubber of imparting desirable properties to the vulcanized product.

Heretofore 1-mercaptobenzothiazole having the formula

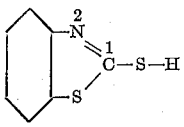

has been used extensively in the rubber industry as an accelerator. Certain derivatives of mercaptobenzothiazole such, for example, as the amine salts have also been found to have accelerative effect on the vulcanization of rubber. Esters, among them the dinitro phenyl ester of mercaptobenzothiazole, have likewise been found to be accelerators.

My invention resides in the discovery that the organic acyl derivatives of the mercaptothiazoles generally are excellent accelerators of the vulcanization of rubber. These substances include compounds illustrated by the following type formula:

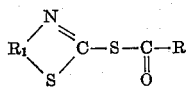

wherein R represents a carbocyclic aromatic group, or a heterocyclic ring system. $R_1$ represents an arylene group, substituted or unsubstituted, such as phenylene. Compounds falling within the scope of my invention include, among other things, the mercaptothiazole derivatives of carboxylic acid halides in which the hydrogen atom of the mercapto group is replaced by the grouping

While the compounds included in my invention may, as indicated, be prepared by reacting the mercaptothiazoles or their salts with the carboxylic acid halides, other methods of preparation may be utilized if desired. It is to be understood, however, that the invention is not restricted by the method of preparation.

The organic acid halides applicable for the manufacture of compounds falling within my invention include those derived from such acids as benzoic, nitro benzoic, halogen substituted benzoic, furoic, phthalic, halogen substituted phthalic, hydroxy benzoic, etc. The thiazole component may be derived from any of the mercaptothiazoles, examples being 1-mercapto 3-methyl thiazole

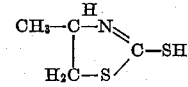

1-mercapto benzothiazole

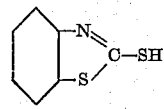

1-mercapto 3-phenyl benzothiazole

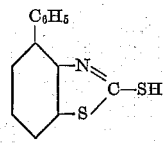

1-mercapto 5-nitro benzothiazole

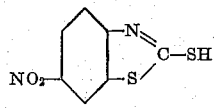

1-mercapto 5-chlor benzothiazole

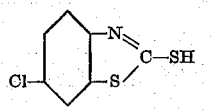

1-mercapto 5-ethyl benzothiazole

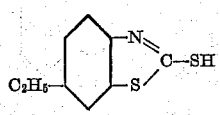

1-mercapto 5-methoxy benzothiazole

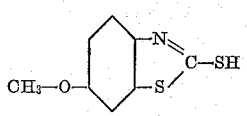

1-mercapto 5-amino benzothiazole

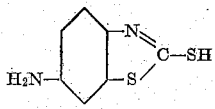

1-mercapto 5-hydroxy benzothiazole

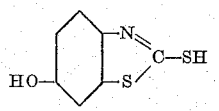

1-mercapto 5-nitro 4-chlor benzothiazole

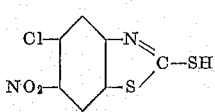

1-mercapto 5-amino 4-chlor benzothiazole

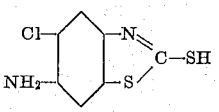

and 1-mercapto 3-ethoxy benzothiazole

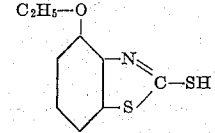

Other aryl thiazoles which may be employed are, for example, tolyl, xylyl and naphthyl thiazoles; also various aliphatic thiazoles other than those specifically mentioned herein.

As illustrative of the products produced by my invention there may be mentioned benzoyl benzothiazyl 1-sulphide having the formula

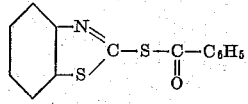

phthalyl bis (benzothiazyl 1-sulphide) having the formula

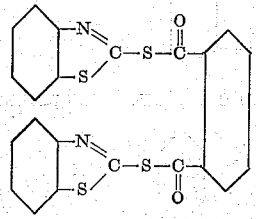

furoyl benzothiazyl 1-sulphide

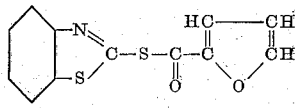

and furoyl 3-methyl benzothiazyl 1-sulphide

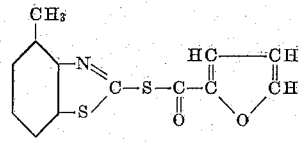

The first of these compounds, benzoyl benzothiazyl 1-sulphide, may be prepared by gradually adding one mol. of benzoyl chloride over a period of approximately one hour to a well cooled, stirred suspension of one mol. of sodium benzothiazyl mercaptide in approximately three parts of dry benzene. Reaction is generally immediate. The resulting solid may be filtered off, dried and washed in water to dissolve out the sodium chloride formed during the reaction. The product after filtering, drying and recrystallizing from benzene has a melting point of approximately 128 degrees C. The reaction may be represented as follows:

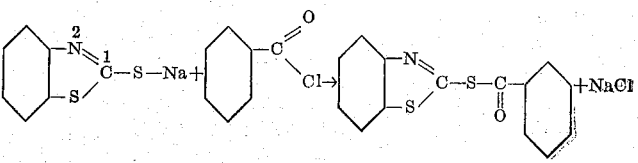

This method is typical of the preparation of any of the organic acyl benzothiazyl sulphides. Phthalyl bis benzothiazyl 1-sulphide may be prepared similarly from one mol. of phthalyl chloride and two mols of sodium benzothiazyl mercaptide. The compound, after filtering, drying and purifying as outlined in the preparation of benzoyl benzothiazyl 1-sulphide, has a melting point of 147–148 degrees C. Likewise, furoyl benzothiazyl 1-sulphide may be prepared by reacting molar quantities of furoyl chloride and sodium benzothiazyl mercaptide, the product melting at 140–143 degrees C. In the preparation of these compounds, a substantially quantitative yield is nearly always obtained, thus making the process commercially practicable. In place of the sodium mercaptide, the mercapto thiazole itself may of course be used.

These compounds may be employed in the ordinary rubber formulae, the following being an example of one in which benzoyl benzothiazyl 1-sulphide was used:

Formula A

| | Parts by weight |
|---|---|
| Rubber (pale crepe) | 50.00 |
| Rubber (smoked sheet) | 50.00 |
| Zinc oxide | 1.00 |
| Sulfur | 3.00 |
| Benzoyl benzothiazyl 1-sulphide | 0.5 |

To test the value of this substance as an accelerator, samples prepared in accordance with the above formula were subjected to vulcanization for varying periods of time. These samples were then subjected to physical tests to ascertain their elasticity and tensile strength. The results are indicated in the following table:

| Cure | | Ultimate tensile kgs./cm.² | Ult. elong. in percent | Modulus (kgs./cm.²) | |
|---|---|---|---|---|---|
| Time in mins. | Temp. F.° | | | 500% | 700% |
| 30 | 260 | 130 | 880 | 16 | 50 |
| 60 | 260 | 170 | 830 | 26 | 80 |
| 90 | 260 | 165 | 800 | 27 | 94 |
| 120 | 260 | 170 | 820 | 26 | 84 |
| 60 | 285 | 170 | 835 | 26 | 80 |
| 120 | 285 | 155 | 835 | 26 | 70 |

Other formulae in which compounds falling within the scope of my invention have been tested are the following:

*Formula B*

| | Parts by weight |
|---|---|
| Rubber (extracted pale crepe) | 100.0 |
| Zinc oxide | 5.0 |
| Sulfur | 3.0 |
| Stearic acid | 1.5 |
| Accelerator | 0.5 |

*Formula C*

| | Parts by weight |
|---|---|
| Rubber (extracted pale crepe) | 100.0 |
| Zinc oxide | 5.0 |
| Sulfur | 3.0 |
| Stearic acid | 1.5 |
| Diphenylguanidine | .20 |
| Accelerator | .50 |

Accelerator tests on compounds prepared by the above formulae gave the following results:

| Cure | | Ultimate tensile kgs./cm.² | Ult. elong. in percent | Modulus (kgs./cm.²) | |
|---|---|---|---|---|---|
| Time in mins. | Temp. F.° | | | 500% | 700% |

PHTHALYL BIS BENZOTHIAZYL 1-SULPHIDE

*Formula B*

| 20 | 285 | 12 | 950 | 4 | 6 |
|---|---|---|---|---|---|
| 40 | 285 | 60 | 925 | 8 | 15 |
| 60 | 285 | 80 | 900 | 11 | 24 |
| 80 | 285 | 95 | 890 | 14 | 30 |
| 120 | 285 | 120 | 900 | 15 | 34 |

*Formula C*

| 20 | 260 | 146 | 875 | 16 | 52 |
|---|---|---|---|---|---|
| 40 | 260 | 200 | 775 | 22 | 128 |
| 60 | 260 | 207 | 740 | 38 | 165 |

| Cure | | Ultimate tensile kgs./cm.² | Ult. elong. in percent | Modulus (kgs./cm.²) | |
|---|---|---|---|---|---|
| Time in mins. | Temp. F.° | | | 500% | 700% |

FUROYL BENZOTHIAZYL 1-SULPHIDE

*Formula B*

| 40 | 260 | 20 | 875 | 6 | 10 |
|---|---|---|---|---|---|
| 60 | 260 | 63 | 925 | 8 | 16 |
| 80 | 260 | 100 | 950 | 10 | 22 |
| 120 | 260 | 120 | 900 | 13 | 35 |
| 160 | 260 | 135 | 850 | 17 | 50 |

*Formula C*

| 30 | 260 | 117 | 915 | 13 | 33 |
|---|---|---|---|---|---|
| 45 | 260 | 145 | 870 | 17 | 53 |
| 60 | 260 | 140 | 830 | 19 | 64 |
| 90 | 260 | 152 | 800 | 24 | 80 |
| 120 | 260 | 175 | 800 | 26 | 90 |

It is apparent from the above table that these compounds have highly desirable properties as accelerators of vulcanization; also, that they are readily activated by organic bases such as diphenylguanidine. They are substantially non-toxic when employed in the amounts used in rubber stocks. They are readily prepared. Certain of these compounds have the further advantage that when properly compounded they yield stocks which are almost pure white in color.

My invention is not limited to the specific compounds herein mentioned, but extends to other compounds of the type above described. It will be understood that I desire to embrace within the scope of this invention such modifications and changes as may be necessary to adapt it to varying conditions and also that I intend that the patent shall cover, by suitable expression in the appended claims, whatever features of patentable novelty reside in the invention.

What I claim is:

1. A process of treating rubber which comprises subjecting it to vulcanization in the presence of a basic nitrogen-containing accelerator and a compound having the formula

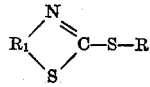

wherein $R_1$ is an ortho arylene radical of the benzene and naphthalene series and R is a furoyl radical.

2. A process of treating rubber which comprises subjecting it to vulcanization in the presence of a basic nitrogen-containing accelerator and furoyl benzothiazyl sulphide.

JAN TEPPEMA.